US012626659B2

United States Patent
Chae et al.

(10) Patent No.: US 12,626,659 B2
(45) Date of Patent: May 12, 2026

(54) DISPLAY DEVICE AND METHOD FOR DRIVING DISPLAY DEVICE

(71) Applicant: LG Display Co., Ltd., Seoul (KR)

(72) Inventors: Jaekown Chae, Paju-si (KR); Donghwan Kim, Paju-si (KR); Eunsup Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/923,494

(22) Filed: Oct. 22, 2024

(65) Prior Publication Data

US 2025/0218366 A1 Jul. 3, 2025

(30) Foreign Application Priority Data

Dec. 28, 2023 (KR) ........................ 10-2023-0195428

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2320/045* (2013.01); *G09G 2330/028* (2013.01)

(58) Field of Classification Search
CPC ........... G09G 2360/04; G09G 2310/08; G09G 2300/026; G09G 2330/06; G09G 2360/122; G09G 3/3233; G09G 3/32; G09G 2320/045; G09G 2330/028; G09G 3/3266–3275; G09G 3/3674–3692; G09G 5/12; G09G 2310/0264; G09G 2310/0267; G09G 2330/02
See application file for complete search history.

(56) References Cited

U.S. PATENT DOCUMENTS

| | | | | |
|---|---|---|---|---|
| 11,830,420 | B1 * | 11/2023 | Zhou | G09G 3/32 |
| 2008/0246697 | A1 * | 10/2008 | Kim | G09G 3/3233 345/76 |
| 2019/0237031 | A1 * | 8/2019 | Cho | G02F 1/13306 |
| 2020/0090580 | A1 * | 3/2020 | Hyeon | G09G 5/14 |
| 2021/0097939 | A1 * | 4/2021 | Chae | G09G 3/3688 |

* cited by examiner

*Primary Examiner* — Roberto W Flores
(74) *Attorney, Agent, or Firm* — Fenwick & West LLP

(57) ABSTRACT

The present disclosure relates to a display device, and more specifically, to a display device in which noise characteristics are improved by outputting mutually inverted switching signals from a first power integrated circuit (IC) and a second power IC. According to the present disclosure, the noise characteristics of the display device are improved by outputting the mutually inverted switching signals from the first power IC and the second power IC.

17 Claims, 18 Drawing Sheets

DISPLAY DEVICE AND METHOD FOR DRIVING DISPLAY DEVICE

CROSS REFERENCE TO RELATED APPLICATION

The present application claims the priority from Republic of Korea Patent Application No. 10-2023-0195428, filed on Dec. 28, 2023, which is hereby incorporated by reference in its entirety.

BACKGROUND

Field

The present disclosure relates to a display device, and more specifically, to a display device in which noise characteristics are improved by outputting an inverted switching signal from a first power integrated circuit (IC) and a second power IC.

Description of Related Art

Recently, as the information age enters, a display field in which electrical information signals are visually expressed has developed rapidly, and in response thereto, various display devices having excellent performance, such as thinness, lightness, and low power consumption, are being developed.

Examples of display devices may include a liquid crystal display (LCD) device, an organic light emitting diode (OLED) display device, a quantum dot display device, etc.

Such a display device uses a timing controller, a frequency generator, a power driver, etc. for an operation thereof.

SUMMARY

The present disclosure is directed to providing a display device in which noise characteristics are improved by outputting an inverted switching signal from a first power integrated circuit (IC) and a second power IC of the display device.

A display device according to one embodiment may include a timing controller configured to output image data, a command signal, and a data enable signal, a display panel including a plurality of pixels and data lines that are connected to the plurality of pixels, a first power driver configured to supply first power to the display panel, the first power driver including a first power integrated circuit (IC) configured to generate a first switching signal based on the data enable signal, and a second power driver configured to supply second power to the display panel, the second power driver including a second power IC configured to generate a second switching signal based on the data enable signal, wherein the first switching signal and the second switching signal have a same phase width with respect to each other, inverted shapes, and a same absolute value of magnitude.

The data enable signal may include a first data enable signal and a second data enable signal. The timing controller may supply the first data enable signal to the first power IC, and supply the second data enable signal to the second power IC.

The data enable signal may include a first data enable signal. The display device may further include a delay circuit configured to receive the first data enable signal from the timing controller, generate a second data enable signal by delaying the first data enable signal, and supply the second data enable signal to the second power IC, wherein the timing controller may supply the first data enable signal to the first power IC.

The delay circuit may include a resistor connected in series to a first signal line through which the first data enable signal is transmitted, and a capacitor connected between a second signal line through which the second data enable signal is transmitted and a ground line.

The display device may further include a frequency generator circuit configured to generate a clock signal and an inverted clock signal, supply the clock signal to the first power IC, and supply the inverted clock signal to the second power IC.

The display device may further include a frequency generator circuit configured to generate a clock signal and supply the clock signal to the first power IC, and an inverter configured to receive the clock signal from the frequency generator and output an inverted clock signal of the received clock signal to the second power IC.

The display device may further include a frequency generator circuit configured to generate a clock signal and supply the clock signal to the first power IC, wherein the first power IC may generate an inverted clock signal by inverting the clock signal, and supply the inverted clock signal to the second power IC.

The display device may further include a phase detector configured to receive the first switching signal from the first power IC and receive the second switching signal from the second power IC.

The phase detector may include an edge detector circuit configured to detect first edges of the first switching signal and second edges of the second switching signal, and generate edge signals based on the first edges and the second edges, and an integrator configured to generate an accumulated signal by accumulating the edge signals and supply the accumulated signal to the first power IC.

A method of driving a display device may include outputting, by a timing controller of the display device, a data enable signal, generating, by a first power IC of a power driver of the display device, first a switching signal based on the data enable signal, supplying, by the first power driver, first power to a display panel of the display device based on the first switching signal, generating, by a second power IC of a second power driver of the display device, a second switching signal based on the data enable signal, and supplying, by the second power driver, second power to the display panel based on the second switching signal, wherein the first switching signal and the second switching signal have a same phase width, inverted shapes with respect to each other, and a same absolute value of magnitude.

The data enable signal may include a first data enable signal and a second data enable signal, and the method may further include supplying, by the timing controller, the first data enable signal to the first power IC, and supplying, by the timing controller, the second data enable signal to the second power IC.

The data enable signal may include a first data enable signal and a second data enable signal, and the method may further include supplying, by the timing controller, the first data enable signal to the first power IC, receiving, by a delay circuit of the display device, the first data enable signal from the timing controller, generating, by the delay circuit, a second data enable signal by delaying the first data enable signal, and supplying, by the delay circuit, the second data enable signal to the second power IC.

The method may further include generating, by a frequency generator circuit of the display device, a clock signal and an inverted clock signal, supplying, by the frequency generator circuit, the clock signal to the first power IC, and supplying, by the frequency generator circuit, the inverted clock signal to the second power IC.

The method may further include generating, by a frequency generator circuit of the display device, a clock signal, supplying, by the frequency generator circuit, the clock signal to the first power IC, receiving, by an inverter of the display device, the clock signal, and outputting, by the inverter, an inverted clock signal of the received clock signal to the second power IC.

A display device according to one embodiment may include a timing controller configured to generate one or more data enable signals, a first display panel having a first plurality of pixels, a second display panel having a second plurality of pixels, a first power driver configured to generate a first switching signal having a first phase based on the one or more data enable signals and supply one or more first output voltages to the first display panel that are generated based on the first switching signal, and a second power driver configured to generate a second switching signal having a second phase that is different from the first phase based on the one or more data enable signals and supply one or more second output voltages to the second display panel that are generated based on the second switching signal.

The first phase may be opposite to the second phase, and the first switching signal and the second switching signal may have a same cycle of one horizontal period and a same absolute value of magnitude.

The one or more data enable signals may include a first data enable signal and a second data enable signal, and the first power driver may generate the first switching signal having the first phase based on the first data enable signal, and the second power driver may generate the second switching signal having the second phase based on the second data enable signal.

The one or more data enable signals may include a first data enable signal, the display device may further include a delay circuit configured to receive the first data enable signal and generate a second data enable signal by delaying the first data enable signal, the first power driver may generate, based on the first data enable signal, the first switching signal having the first phase, and the second power driver may generate, based on the second data enable signal, the second switching signal having the second phase.

The one or more data enable signals may include a clock signal and an inverted clock signal, the timing controller may include a frequency generator circuit that generates the clock signal and the inverted clock signal, the first power driver may generate, based on the clock signal, the first switching signal having the first phase, and the second power driver may generate, based on the inverted clock signal, the second switching signal having the second phase.

The one or more data enable signals may include a clock signal, the timing controller may include a frequency generator circuit that generates the clock signal, the first power driver may generate, based on the clock signal, the first switching signal having the first phase, and the second power driver may generate, based on the inverted clock signal, the second switching signal having the second phase.

The one or more data enable signals may include a clock signal, the timing controller may include a frequency generator circuit that generates the clock signal, the first power driver includes a first power integrated circuit (IC) that receives the clock signal from the frequency generator circuit, generates, based on the first clock signal, the first switching signal having the first phase, and generates an inverted clock signal by inverting the clock signal, and the second power driver includes a second power IC that receives the inverted clock signal from the first power IC, and generate, based on the inverted clock signal, the second switching signal having the second phase.

The display device may further include an edge detector circuit that receives the first switching signal and the second switching signal, detects first edges of the first switching signal and second edges of the second switching signal, and generate edge signals based on the first edges and the second edges. The display device may further include an integrator that receives the edge signals from the edge detector circuit, and generates an accumulated signal by accumulating the edge signals, wherein the first power IC receives the accumulated signal from the integrator, and adjusts, based on the accumulated signal, a phase of the inverted clock signal.

The first power driver may further include a first transistor that receives the first switching signal from the first power IC, and generates, based on the first switching signal, a first DC output voltage of the one or more first output voltages. The second power driver may further include a second transistor that receives the second switching signal from the second power IC, and generates, based on the second switching signal, a second DC output voltage of the one or more second output voltages.

DETAILED DESCRIPTION

Figure 1:
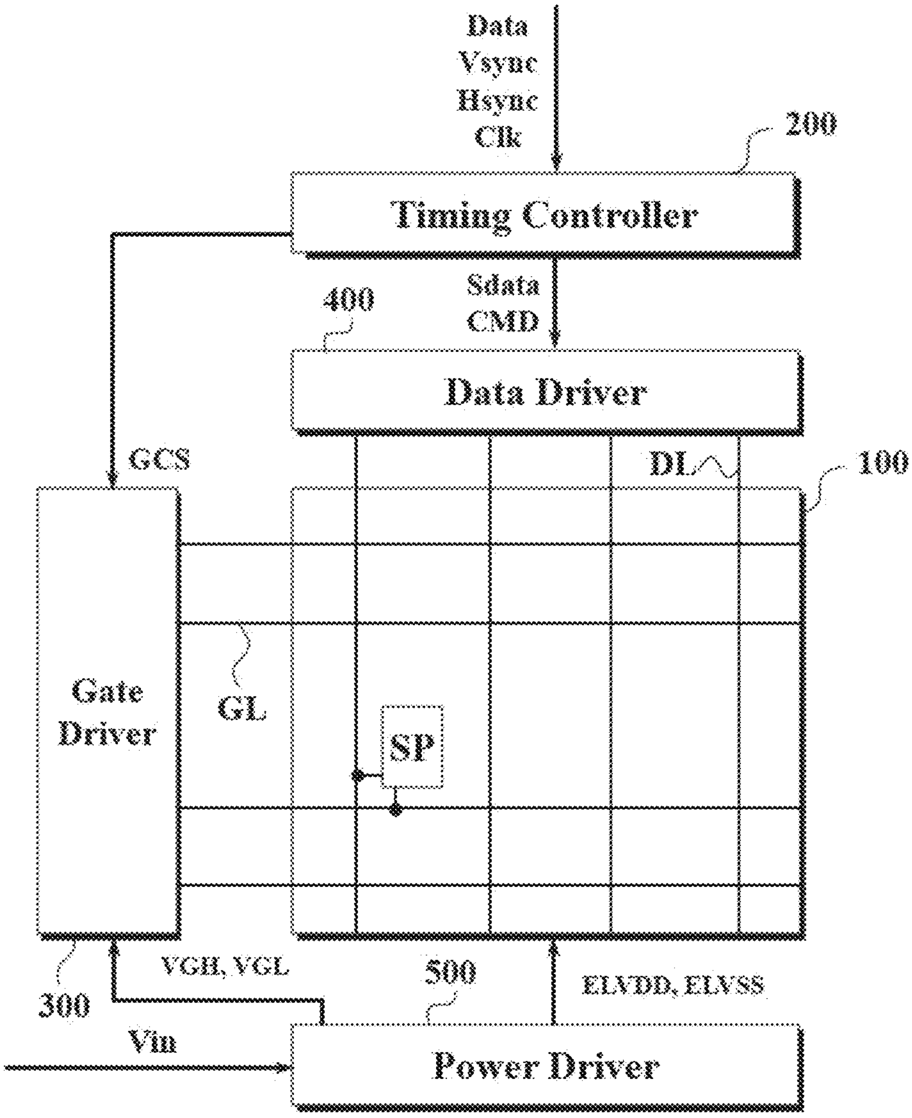
FIG. 1 is a block diagram showing a display device according to one or more embodiments of the present disclosure.

Advantages and features of the present disclosure and methods for achieving them will become clear with reference to embodiments described below in detail in conjunction with the accompanying drawings. The present disclosure is not limited to the embodiments disclosed below but can be implemented in various different forms, these embodiments are merely provided to make the disclosure of the present disclosure complete and fully inform those skilled in the art to which the present disclosure pertains of the scope of the present disclosure, and the present disclosure is only defined by the scope of the appended claims.

Since shapes, sizes, ratios, angles, numbers, and the like disclosed in the drawings for describing the embodiments of the present disclosure are illustrative, the present disclosure is not limited to the shown items. The same reference number indicates the same components throughout the specification. In addition, in describing the present disclosure, when it is determined that the detailed description of a related known technology may unnecessarily obscure the gist of the present disclosure, detailed description thereof will be omitted.

When the terms "comprise," "include," "have," and "comprise" described in the present specification are used, other parts may be added unless "only" is used. When a component is expressed in the singular, it can be construed as a plurality of components unless specifically stated otherwise.

In construing a component, the component is construed as including the margin of error even when there is no separate explicit description.

When the positional relationship is described, for example, when the positional relationship between two components is described using the term "on," "above," "under," "next to," or the like, one or more other components may be positioned between the components unless the term "immediately" or "directly" is used.

Although the term "first," "second," or the like may be used to distinguish components, functions or structures of the components are not limited by the ordinal number or component name added to the front of the component.

The following embodiments may be partially or fully coupled or combined, and various technological interworking and driving are possible. The embodiments may be implemented independently of each other and implemented together in the associated relationship.

A driving circuit of a display device may write pixel data of input images into pixels. A driving circuit of a flat panel display device may include a data driver for supplying data signals to data lines, and a gate driver circuit for supplying gate signals to gate lines.

In the display device according to the present disclosure, each of a pixel circuit and a gate driver circuit may include a plurality of transistors and may be formed directly on a substrate of a display panel. The transistor may be implemented as a thin film transistor (TFT) having a metal-oxide-semiconductor field effect transistor (MOSFET) structure and may be an oxide TFT containing an oxide semiconductor or a low temperature polysilicon (LTPS) TFT containing LTPS.

A transistor is a three-electrode element including a gate, a source, and a drain. The source is an electrode for supplying carriers to the transistor. The carriers start to flow from the source in the transistor. The drain is an electrode through which the carriers moves from the transistor to the outside. In the transistor, flows of the carriers flow from the source to the drain. In the case of an n-channel transistor, since the carriers are electrons, a source voltage has a lower voltage than a drain voltage so that the electrons may flow from the source to the drain. In the n-channel transistor, a direction of the current flows from the drain to the source. In the case of a p-channel transistor, since the carriers are holes, the source voltage is higher than the drain voltage so that the holes may flow from the source to the drain. In the p-channel transistor, a current flows from the source to the drain because the holes flow from the source to the drain. It should be noted that the source and drain of the transistor are not fixed. For example, the source and the drain may be changed depending on an applied voltage. Therefore, the disclosure is not limited by the source and drain of the transistor. In the following description, the source and drain of the transistor are referred to as "first and second electrodes."

A gate signal may swing between a gate-on voltage and a gate-off voltage. The gate-on voltage is set to a voltage higher than a threshold voltage of the transistor. The gate-off voltage is set to a voltage lower than the threshold voltage of the transistor.

While the transistor is turned on in response to the gate-on voltage, the transistor is turned off in response to the gate-off voltage. In the case of the n-channel transistor, the gate-on voltage may be a gate high voltage VGH or VEH, and the gate-off voltage may be a gate low voltage VGL or VEL. In the case of the p-channel transistor, the gate-on voltage may be the gate low voltage VGL or VEL, and the gate-off voltage may be the gate high voltage VGH or VEH. In the following embodiments, although an example in which transistors of a pixel circuit are implemented as p-channel transistors will be mainly described, it should be noted that the present disclosure is not limited thereto.

Hereinafter, various embodiments of the present disclosure will be described in detail with reference to the accompanying drawings. In the following embodiments, although an example in which the display device is an OLED display device, the present disclosure is not limited thereto.

FIG. 1 is a block diagram showing a display device according to one or more embodiments of the present disclosure.

Referring to FIG. 1, a display device according to one or more embodiments of the present disclosure may include a display panel 100, a timing controller 200, a gate driver circuit 300, a data driver 400, and a power driver 500.

The display panel 100 includes a pixel array in which input images are displayed on a screen. The pixel array includes a plurality of data lines DL, a plurality of gate lines GL intersecting the data lines DL, and sub-pixels SP disposed in a matrix form.

The display panel 100 may be implemented as a non-transmissive display panel or a transmissive display panel. The display panel 100 may be manufactured as a flexible display panel. The flexible display panel may be implemented as an OLED panel using a plastic substrate.

The timing controller 200 receives digital video data Data of input images and timing signals Vsync, Hsync, and Clk synchronized therewith from a set system (or a host system). The digital video data is a differential data signal and may be serial data. The timing signals may include the vertical synchronization signal Vsync, the horizontal synchronization signal Hsync, and the clock signal Clk. The set system or the host system may include a TV, a monitor, a set-top box, a navigation system, a personal computer, a home theater system, a mobile device, a wearable device, a vehicle system, etc.

The timing controller 200 may control an operation timing of the display panel 100 according to an input frequency (or a driving frequency). The input frequency may be 60 Hz in a national television standards committee (NTSC) format. Recently, display devices driven at a higher frequency of 120 Hz have become popular. In addition, the display device driven at 120 Hz may be controlled to be temporarily driven at 60 Hz in some cases. In addition, recently, display devices that support a variable refresh rate (VRR) at which the display device is operated by decreasing a frame frequency to a frequency between 1 Hz and 30 Hz in a low-speed driving mode and increasing the frame frequency to 144 Hz in the case of high-resolution images (e.g., a gaming mode) have been developed.

The timing controller 200 may output serial image data Sdata provided to the data driver 400, command data CMD for controlling the data driver 400, and a gate control signal GCS for controlling the gate driver circuit 300 based on the received timing signals Vsync, Hsync, and Clk.

The gate driver circuit 300 may be implemented as a gate in panel (GIP) circuit formed directly on the display panel 100 together with a TFT array of a pixel array and lines. The gate driver circuit 300 may sequentially output the gate signals to the gate lines GL under the control of the timing controller 200. The gate driver circuit 300 may sequentially output the signals to the plurality of gate lines GL by shifting the gate signals using a shift register unit (not shown).

The data driver 400 may convert the pixel data of the input images received as a digital signal from the timing controller 200 in each frame period into gamma compensation voltages using a digital-to-analog converter (not shown) and output data voltages. The data driver 400 may be implemented as a plurality of source drive integrated circuits. The data driver 400 may be electrically connected to the data lines DL of the display panel 100 through a chip on glass (COG) process or a tape automated bonding (TAB) process.

The power driver 500 may output DC powers required to drive the pixel array of the display panel 100 and the drivers 300 and 400 using a DC-DC converter. The power driver 500 may receive a DC input voltage Vin and output DC voltages such as a gate high voltage VGH, a gate low voltage VGL, a high potential power voltage ELVDD, a low potential power voltage ELVSS, a high potential reference voltage (not shown), and an initialization voltage (not shown).

Specifically, the gate high voltage VGH is a voltage set to threshold voltages or more of transistors formed in an array of sub-pixels SP. The gate high voltage VGH may be output power driver 500 to the gate driver circuit 300 and supplied to the level shifter in the gate driver circuit 300.

The gate low voltage VGL is a voltage smaller than the threshold voltages of the transistors formed in the array of the sub-pixels SP. The gate low voltage VGL may be supplied to the level shifter (not shown) in the gate driver circuit 300.

The high potential power voltage ELVDD is a voltage supplied to an anode of a light emitting element and is a positive voltage for driving the light emitting element. The high potential power voltage ELVDD may be supplied to a high potential power voltage line connected to each sub-pixel SP in the display panel 100. The low potential power voltage ELVSS is a voltage supplied to a cathode of a light emitting element and is a negative voltage for driving the light emitting element. The low potential power voltage ELVSS may be supplied to a low potential power voltage line connected to each sub-pixel SP in the display panel 100.

Figure 2:
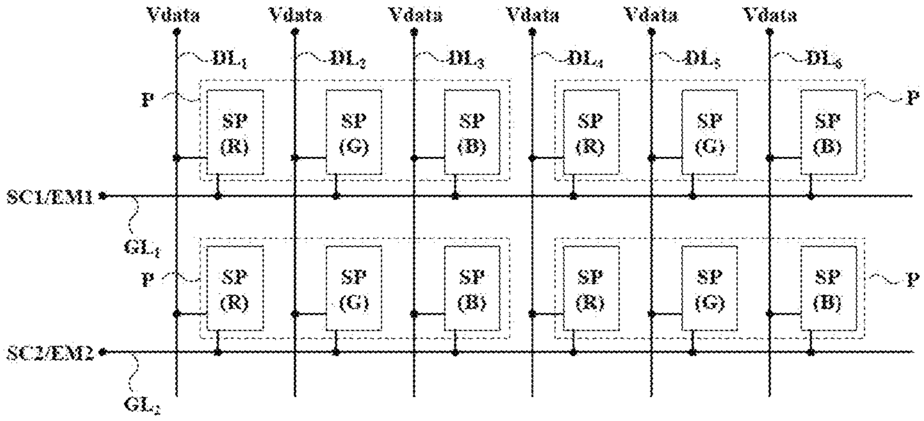
FIG. 2 is a view showing pixels and sub-pixels according to one or more embodiments of the present disclosure.

FIG. 2 is a view showing pixels and sub-pixels according to one or more embodiments of the present disclosure.

The pixel may have the arrangement shown in FIG. 2. Referring to FIG. 2, each pixel P may include a plurality of sub-pixels SP. The sub-pixels SP may include a red sub-pixel SP(R), a green sub-pixel SP(G), and a blue sub-pixel SP(B). In some cases, the pixel P may further include a white sub-pixel (not shown).

Each of data lines $DL_1$ to $DL_6$ may transmit data voltages Vdata for displaying images to the sub-pixels SP. Gate signals such as scan signals $SC_1$ and $SC_2$ for turning on and off the transistors, and emission signals $EM_1$ and $EM_2$ for controlling light emission may be applied to the gate lines GL1 and $GL_2$, respectively.

The gate signal may be in the form of a pulse that swings between a gate-on voltage and a gate-off voltage. The scan signals $SC_1$ and $SC_2$ may select pixels of the gate line into which data is written in synchronization with the data voltage Vdata. The emission signals $EM_1$ and $EM_2$ can define emission times of the pixels.

Figure 3:
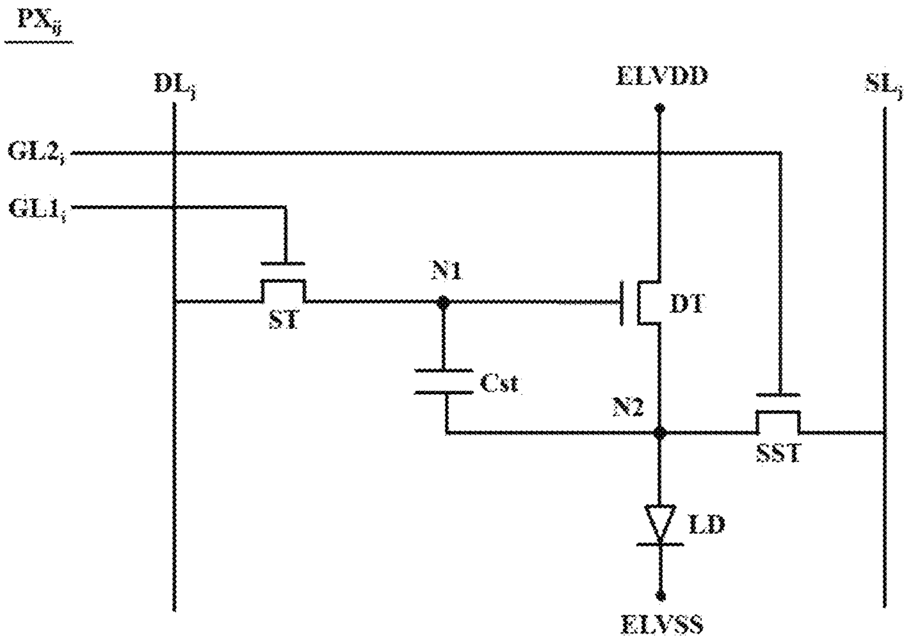
FIG. 3 is a circuit diagram showing a circuit of the sub-pixel according to one or more embodiments of the present disclosure.

FIG. 3 is a circuit diagram showing a circuit of the sub-pixel according to one or more embodiments of the present disclosure. FIG. 3 shows an example in which a pixel $PX_{ij}$ connected to an $i^{th}$ gate line $GL_i$ and a $j^{th}$ data line $DL_j$.

Referring to FIG. 3, the pixel PXij may include a switching transistor ST, a driving transistor DT, a sensing transistor SST, a storage capacitor Cst, and a light emitting element LD.

A first electrode (e.g., a source electrode) of the switching transistor ST may be electrically connected to the $j^{th}$ data line $DL_j$, and a second electrode (e.g., a drain electrode) thereof may be electrically connected to a first node N1. A gate electrode of the switching transistor ST may be electrically connected to an $i^{th}$ first gate line $GL\mathbf{1}_i$. The switching transistor ST may be turned on when a gate signal at a gate-on level is applied to the $i^{th}$ first gate line $GL\mathbf{1}_i$ to transmit a data signal applied to the $j^{th}$ data line DLj to the first node N1.

A first electrode of the storage capacitor Cst may be electrically connected to the first node N1, and a second electrode thereof may be connected to a second node N2. A first electrode of the light emitting element LD may be electrically connected to the second node N2. The storage capacitor Cst may be charged to a voltage corresponding to a difference between a voltage applied to the first node N1 and a voltage applied to the second node N2.

A first electrode (e.g., a source electrode) of the driving transistor DT may be configured to receive the high potential driving voltage ELVDD, and a second electrode (e.g., a drain electrode) thereof may be electrically connected to the second node N2. A gate electrode of the driving transistor DT may be electrically connected to the first node N1. The driving transistor DT may be turned on when a voltage at a gate-on level is applied through the first node N1 and may control the amount of a driving current flowing through the light emitting element LD in response to the voltage provided to the gate electrode.

A first electrode (e.g., a source electrode) of the sensing transistor SST may be electrically connected to a $j^{th}$ sensing line $SL_j$, and a second electrode (e.g., a drain electrode) thereof may be electrically connected to the second node N2. A gate electrode of the sensing transistor SST may be electrically connected to an $i^{th}$ second gate line $GL2_i$. The sensing transistor SST may be turned on when a sensing signal at the gate-on level is applied to the $i^{th}$ second gate line $GL2_i$ to transmit a reference voltage applied to the $j^{th}$ sensing line $SL_j$ to the first electrode of the light emitting element LD.

The light emitting element LD may emit light corresponding to the driving current. The light emitting element LD may output light corresponding to any one of red, green, blue, and white. The light emitting element LD may be an OLED or an ultra-small inorganic light emitting element having the size ranging from micro to nano scale, but the present embodiment is not limited thereto. Hereinafter, the technical spirit of the present embodiment will be described with reference to an embodiment in which the light emitting element LD is configured as the OLED.

In the present embodiment, a structure of the pixels $PX_{ij}$ is not limited to that shown in FIG. 3. According to the embodiment, the pixels $PX_{ij}$ may further include at least one element for compensating a threshold voltage of the driving transistor DT or initializing a voltage of the gate electrode of the driving transistor DT and/or a voltage of the first electrode of the light emitting element LD. In this case, the sensing transistor SST may be omitted from the pixel $PX_{ij}$.

FIG. 3 shows an example in which the switching transistor ST, the driving transistor DT, and the sensing transistor SST are NMOS transistors, but the present disclosure is not limited thereto. For example, at least some or all of the transistors forming each pixel PX may be formed as PMOS transistors. In various embodiments, the switching transistor ST, the driving transistor DT, and the sensing transistor SST may each be implemented as an LTPS TFT, an oxide TFT, or a low temperature polycrystalline oxide (LTPO) TFT.

Figure 4:
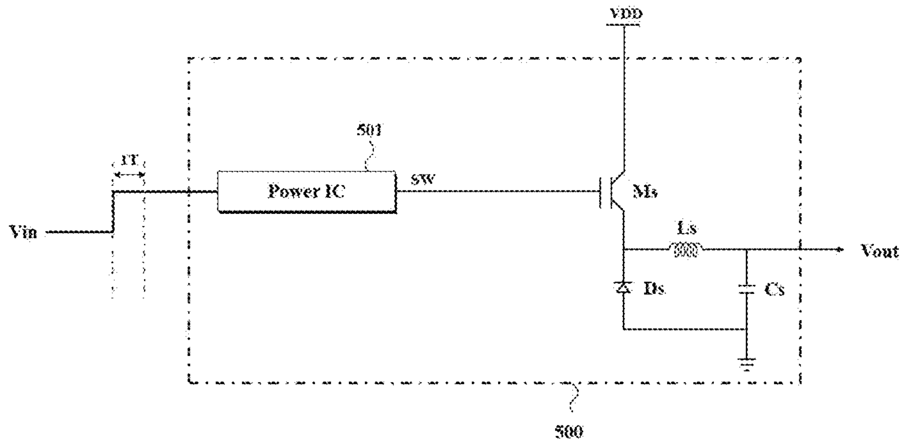
FIG. 4 is a circuit diagram showing the inside of a power driver according to one or more embodiments of the present disclosure.

FIG. 4 is a circuit diagram showing the inside of a power driver according to one or more embodiments of the present disclosure.

Referring to FIG. 4, the power driver 500 may receive the DC input voltage Vin and generate a DC output voltage Vout. The DC output voltage Vout may be the gate high voltage VGH, the gate low voltage VGL, the high potential power voltage ELVDD, or the low potential power voltage ELVSS.

A power integrated circuit (IC) 501 may output a switching signal SW. The switching signal SW may be input to a gate electrode of a switching MOSFET Ms to generate the DC output voltage Vout using a pulse width modulation (PWM) method. In this case, to stably output the DC output voltage Vout, the power driver 501 may further include a switching diode Ds, a switching inductor Ls, and a switching capacitor Cs.

Figure 5:
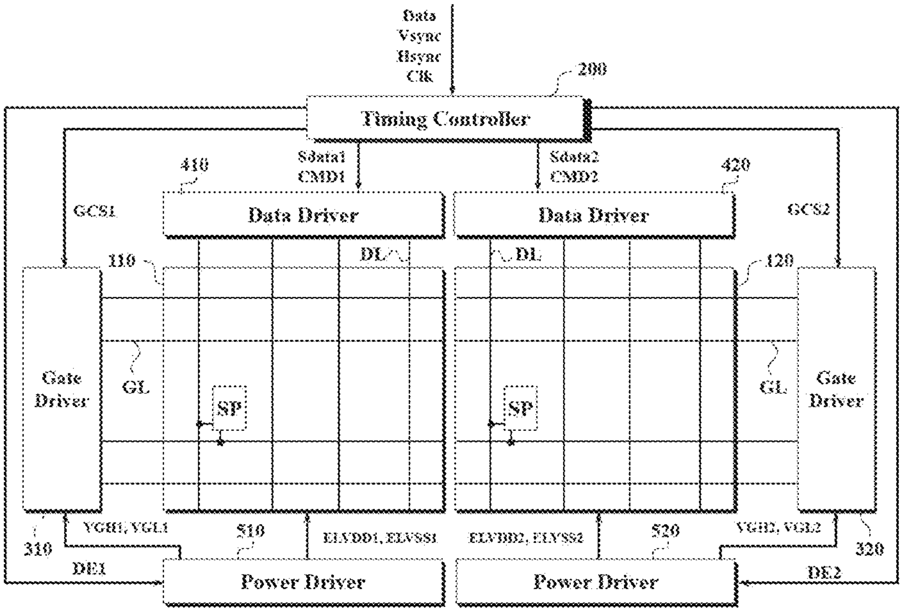
FIG. 5 is a block diagram showing a display device according to a first embodiment of the present disclosure.

FIG. 5 is a block diagram showing a display device according to a first embodiment of the present disclosure.

Referring to FIG. 5, the display device according to the first embodiment of the present disclosure may include a first display panel 110, a second display panel 120, a timing controller 200, a first gate driver circuit 310, a second gate driver circuit 320, a first data driver 410, a second data driver 420, a first power driver 510, and a second power driver 520.

Referring to FIGS. 1 and 5, the display panel 100 may be separately driven as the first display panel 110 and the second display panel 120.

The timing controller 200 receives digital video data Data of input images and timing signals Vsync, Hsync, and Clk synchronized therewith from the set system (or the host system). The digital video data Data is a differential data signal and is serial data. The timing signals may include the vertical synchronization signal Vsync, the horizontal synchronization signal Hsync, and the clock signal Clk. The timing controller 200 may control operation timings of the first display panel 110 and the second display panel 120 according to the input frequency (or the driving frequency).

The timing controller 200 may output each of serial image data Sdata1, Sdata2 provided to the first data driver 410 and the second data driver 420, command data CMD1 and CMD2 for controlling the first data driver 410 and the second data driver 420, and gate control signals GCS1 and GCS2 for controlling the first gate driver circuit 310 and the second gate driver circuit 320 based on the received timing signals Vsync, Hsync, and Clk.

The first power driver 510 and the second power driver 520 may output gate high voltages VGH1 and VGH2, gate low voltages VGL1 and VGL2, high potential power voltages ELVDD1 and ELVDD2, and low potential power voltages ELVSS1 and ELVSS2. The timing controller 200 may supply a first data enable signal DE1 and a second data enable signal DE2 to the first power driver 510 and the second power driver 520, respectively. The first data enable signal DE1 and the second data enable signal DE2 are signals having a cycle of one horizontal period 1H. The first power driver 510 may supply gate high voltage VGH1 and gate low voltage VGL1 to the first gate driver circuit 310. The second power driver 520 may supply gate high voltage VGH2 and gate low voltage VGL2 to the second gate driver circuit 320.

Figure 6:
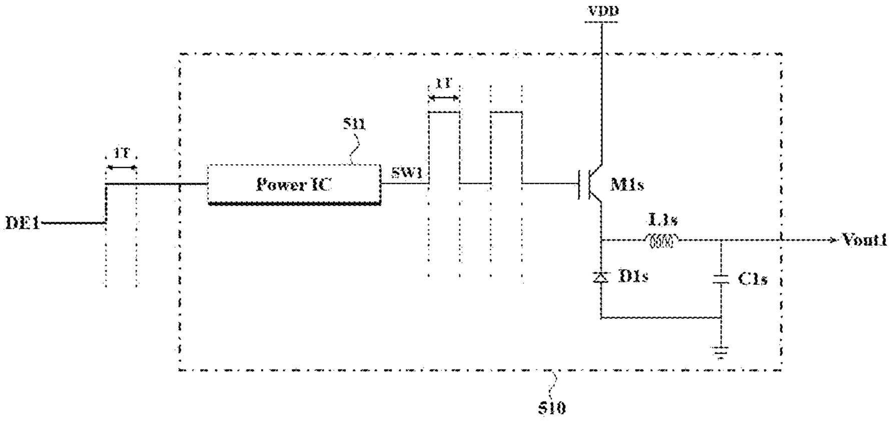
FIG. 6 is a circuit diagram showing the inside of a first power driver and a switching signal output from a first power IC according to the first embodiment of the present disclosure.
Figure 7:
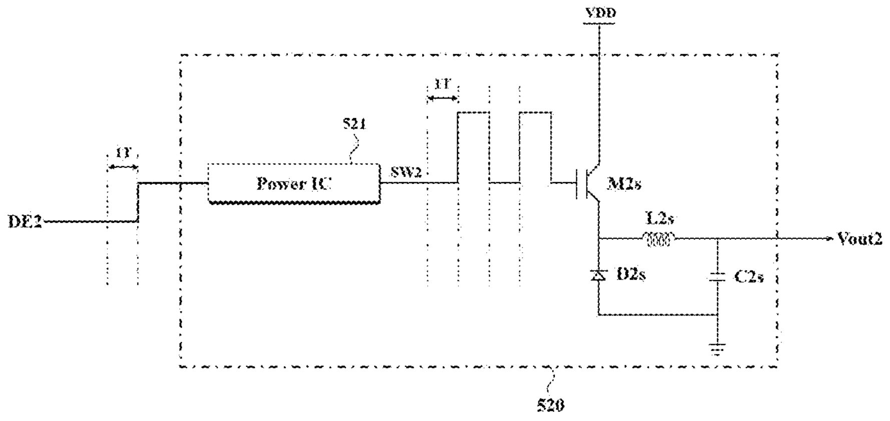
FIG. 7 is a circuit diagram showing the inside of a second power driver and a switching signal output from a second power IC according to the first embodiment of the present disclosure.

FIG. 6 is a circuit diagram showing the inside of a first power driver and a switching signal output from a first power IC according to the first embodiment of the present disclosure, and FIG. 7 is a circuit diagram showing the inside of a second power driver and a switching signal output from a second power IC according to the first embodiment of the present disclosure.

Referring to FIGS. 6 and 7, the first power IC 511 and the second power IC 521 may output a first switching signal SW1 and a second switching signal SW2, respectively. Phase widths of the first switching signal SW1 and the second switching signal SW2 may be one cycle (1T).

Referring to FIG. 6, the first switching signal SW1 may be input to a gate electrode of a first switching MOSFET M1s to generate a first DC output voltage Vout1 using the PWM method. In this case, to stably output the first DC output voltage Vout1, the first power driver 510 may further include a first switching diode D1s, a first switching inductor L1s, and a first switching capacitor C1s.

Referring to FIG. 7, the second switching signal SW2 may be input to a gate electrode of a second switching MOSFET M2s to generate a second DC output voltage Vout2 using the PWM method. In this case, to stably output the second DC output voltage Vout2, the second power driver 520 may further include a second switching diode D2s, a second switching inductor L2s, and a second switching capacitor C2s.

Referring to FIGS. 6 and 7, the second data enable signal DE2 may be a signal that is one cycle (1T) later than the first data enable signal DE1. Therefore, the second switching signal SW2 generated based on the second data enable signal DE2 may be a signal that is one cycle (1T) later than the first switching signal SW1 generated based on the first data enable signal DE1.

Figure 8:
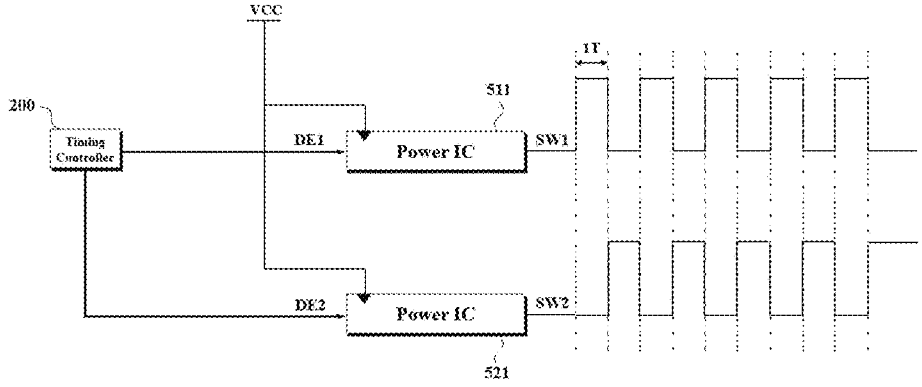
FIG. 8 is a timing diagram showing the switching signals output from the first power IC and the second power IC according to the first embodiment of the present disclosure.

FIG. 8 is a timing diagram showing the switching signals output from the first power IC and the second power IC according to the first embodiment of the present disclosure.

Referring to FIG. 8, the timing controller 200 may supply the first data enable signal DE1 to the first power IC 511, and the first power IC 511 may output the first switching signal SW1. In addition, the timing controller 200 may supply the second data enable signal DE2 to the second power IC 521, and the second power IC 521 may output the second switching signal SW2.

The second data enable signal DE2 output from the timing controller 200 may be a signal that is one cycle (1T) later than the first data enable signal DE1. Since the phase widths of the first switching signal SW1 and the second switching signal SW2 are 1 cycle (1T), the second switching signal SW2 and the first switching signal SW1 may have the same phase width, inverted shapes with respect to each other, and the same absolute value of magnitude (inverted signals). Hence, the first switching signal SW1 may have a first phase, the second switching signal SW2 may have a second phase, and the first phase may be opposite to the second phase.

Figure 9:
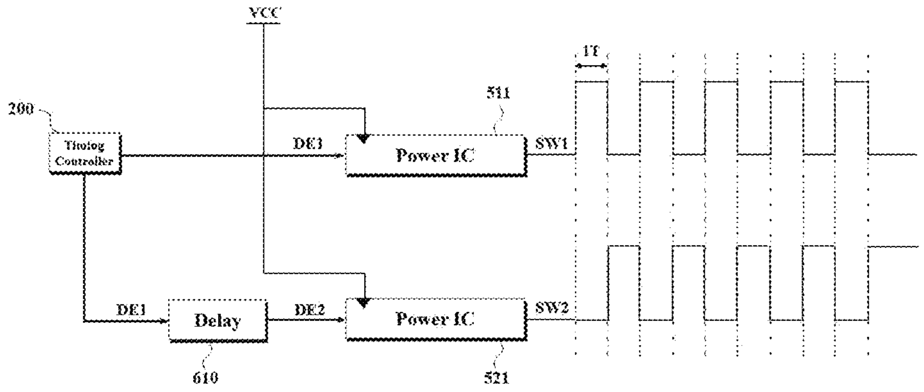
FIG. 9 is a circuit diagram showing that a second data enable signal is supplied from a delay circuit to the second power IC according to a second embodiment of the present disclosure.

FIG. 9 is a circuit diagram showing that a second data enable signal is supplied from a delay circuit to the second power IC according to a second embodiment of the present disclosure.

Referring to FIG. 9, the timing controller 200 may supply the first data enable signal DE1 to the first power IC 511, and the first power IC 511 may output the first switching signal SW1. In addition, the timing controller 200 may supply the first data enable signal DE1 to the delay circuit 610, the delay circuit 610 may supply the second data enable signal DE2 to the second power IC 521, and the second power IC 521 may output the second switching signal SW2.

The second data enable signal DE2 output from the delay circuit 610 may be a signal that is one cycle (1T) later than the first data enable signal DE1. Since the phase widths of the first switching signal SW1 and the second switching signal SW2 are 1 cycle (1T), the second switching signal SW2 and the first switching signal SW1 may have the same phase width, inverted shapes with respect to each other, and the same absolute value of magnitude (inverted signals).

Figure 10:
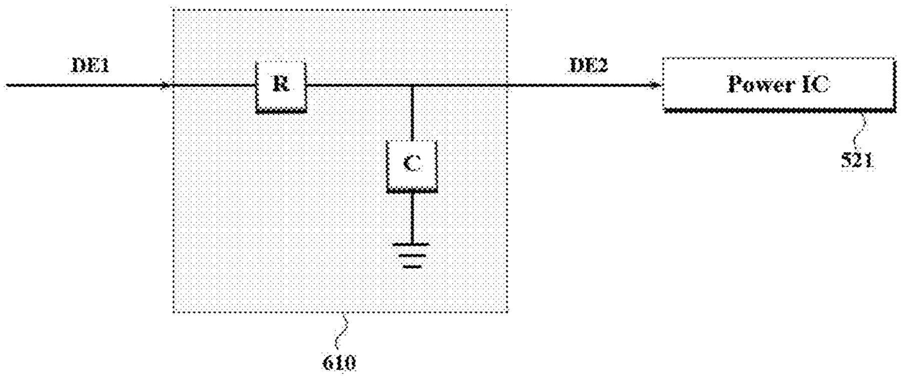
FIG. 10 is a circuit diagram showing the inside of the delay circuit according to the second embodiment of the present disclosure.

FIG. 10 is a circuit diagram showing the inside of the delay circuit according to the second embodiment of the present disclosure.

The delay circuit 610 may include a resistor R connected in series to a signal line through which the first data enable signal DE1 is transmitted, and a capacitor C connected between a signal line through which the second data enable signal DE2 is transmitted and a ground line.

By adjusting the size of the resistor and the capacity of the capacitor, the second data enable signal DE2 may be generated by delaying the first data enable signal DE1. In this case, when the second data enable signal DE2 is delayed by one cycle (1T) from the first data enable signal DE1, the second switching signal SW2 and the first switching signal SW1 may have the same phase width, inverted shapes with respect to each other, and the same absolute value of magnitude (inverted signals).

Figure 11:
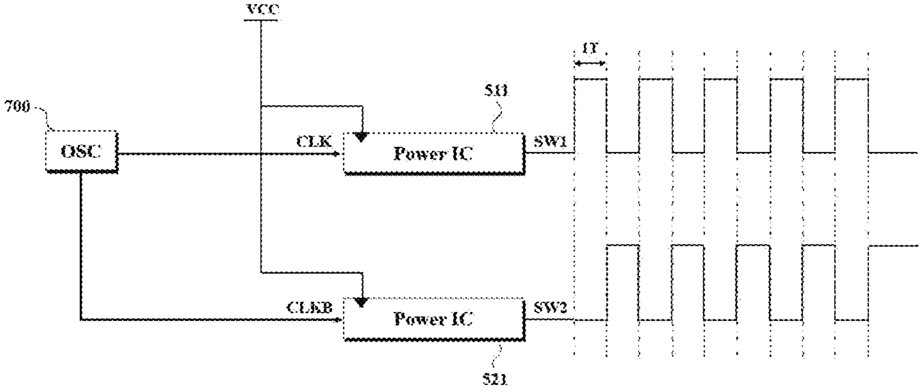
FIG. 11 is a timing diagram showing switching signals output from a first power IC and a second power IC according to a third embodiment of the present disclosure.

FIG. 11 is a timing diagram showing switching signals output from a first power IC and a second power IC according to a third embodiment of the present disclosure.

Referring to FIG. 11, a frequency generator circuit 700 may supply the clock signal CLK to the first power IC 511, and the first power IC 511 may output the first switching signal SW1. In addition, the frequency generator circuit 700 may supply an inverted clock signal CLKB to the second power IC 521, and the second power IC 521 may output the second switching signal SW2. In one or more embodiments, the frequency generator circuit 700 is part of the timing controller 200.

The clock signal CLK output from the frequency generator circuit 700 may be a signal that is one cycle (1T) later than the inverted clock signal CLKB. Since the phase widths of the first switching signal SW1 and the second switching signal SW2 are 1 cycle (1T), the second switching signal SW2 and the first switching signal SW1 may have the same phase width, inverted shapes with respect to each other, and the same absolute value of magnitude (inverted signals).

Figure 12:
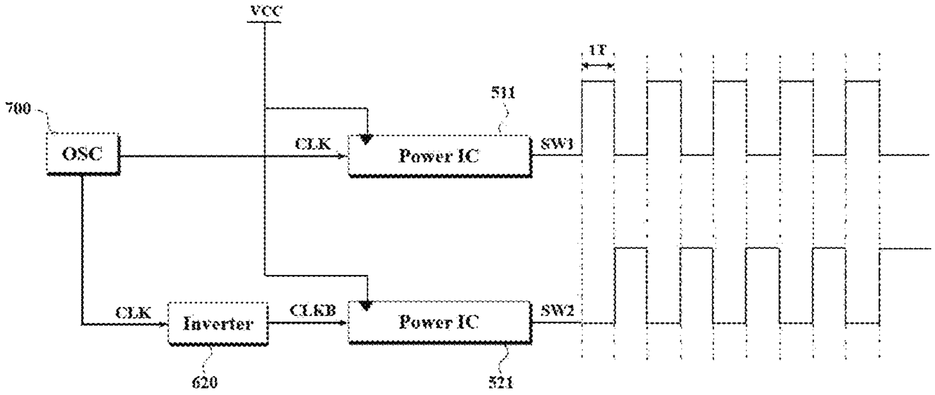
FIG. 12 is a circuit diagram showing that an inverted clock signal is supplied from an inverter unit to a second power IC according to a fourth embodiment of the present disclosure.

FIG. 12 is a circuit diagram showing that an inverted clock signal is supplied from an inverter unit to a second power IC according to a fourth embodiment of the present disclosure.

Referring to FIG. 12, the frequency generator circuit 700 may supply the clock signal CLK to the first power IC 511, and the first power IC 511 may output the first switching signal SW1. In addition, the frequency generator circuit 700 may supply the clock signal CLK to the inverter 620, the inverter 620 may supply the inverted clock signal CLKB to the second power IC 521, and the second power IC 521 may output the second switching signal SW2.

The inverted clock signal CLKB output from the inverter 620 may be a signal that is one cycle (1T) later than the clock signal CLK. Since the phase widths of the first switching signal SW1 and the second switching signal SW2 are 1 cycle (1T), the second switching signal SW2 and the first switching signal SW1 may have the same phase width, inverted shapes with respect to each other, and the same absolute value of magnitude (inverted signals).

Figure 13:
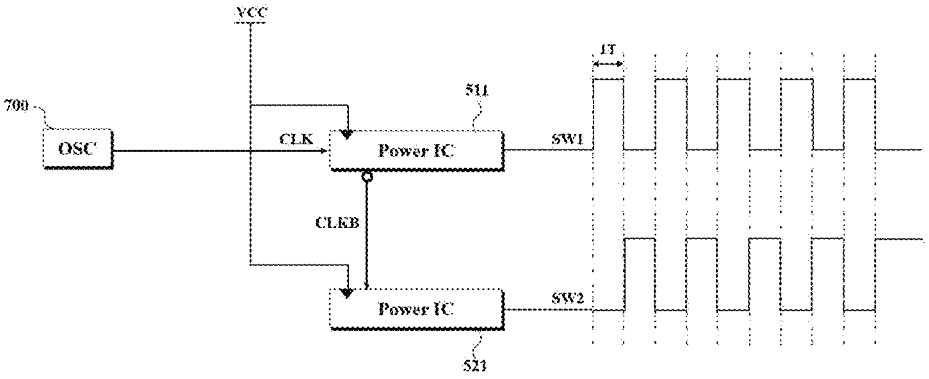
FIG. 13 is a timing diagram showing switching signals output from a first power IC and a second power IC according to a fifth embodiment of the present disclosure.

FIG. 13 is a timing diagram showing switching signals output from a first power IC and a second power IC according to a fifth embodiment of the present disclosure.

Referring to FIG. 13, the frequency generator circuit 700 may supply the clock signal CLK to the first power IC 511, and the first power IC 511 may output the first switching signal SW1. The first power IC 511 may supply the inverted clock signal CLKB to the second power IC 521, and the second power IC 521 may output the second switching signal SW2.

The first power IC 521 may generate the inverted clock signal CLKB based on the clock signal CLK. By generating the inverted clock signal CLKB from the first power IC 511 and supplying the inverted clock signal CLKB to the second power IC 521, it is possible to reduce a phase difference between the clock signal CLK and the inverted clock signal CLKB.

The inverted clock signal CLKB output from the first power IC 521 may be a signal that is one cycle (1T) later than the clock signal CLK. Since the phase widths of the first switching signal SW1 and the second switching signal SW2 are 1 cycle (1T), the second switching signal SW2 and the first switching signal SW1 may have the same phase width, inverted shapes with respect to each other, and the same absolute value of magnitude (inverted signals).

Figure 14:
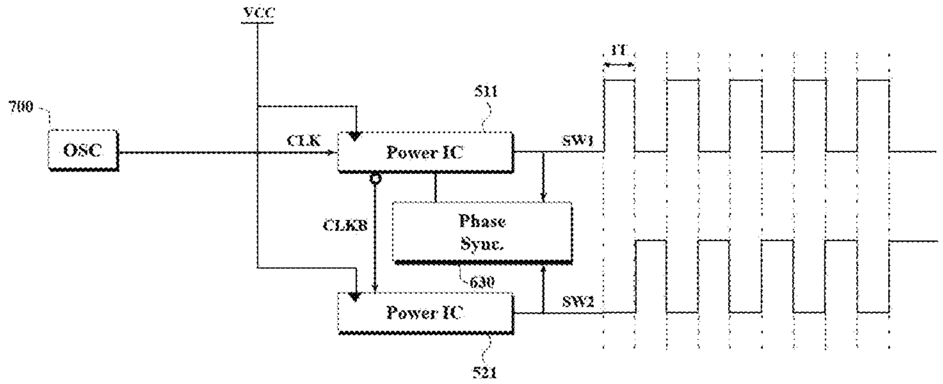
FIG. 14 is a circuit diagram showing that the switching signals are supplied from the first power IC and the second power IC to a phase detector according to the fifth embodiment of the present disclosure.

FIG. 14 is a circuit diagram showing that the switching signals are supplied from the first power IC and the second power IC to a phase detector according to the fifth embodiment of the present disclosure.

Referring to FIG. 14, a phase detector 630 may receive the switching signals SW1 and SW2 and determine whether the first switching signal SW1 and the second switching signal SW2 have the same phase width, inverted shapes with respect to each other, the same absolute value of magnitude, etc.

Figure 15:
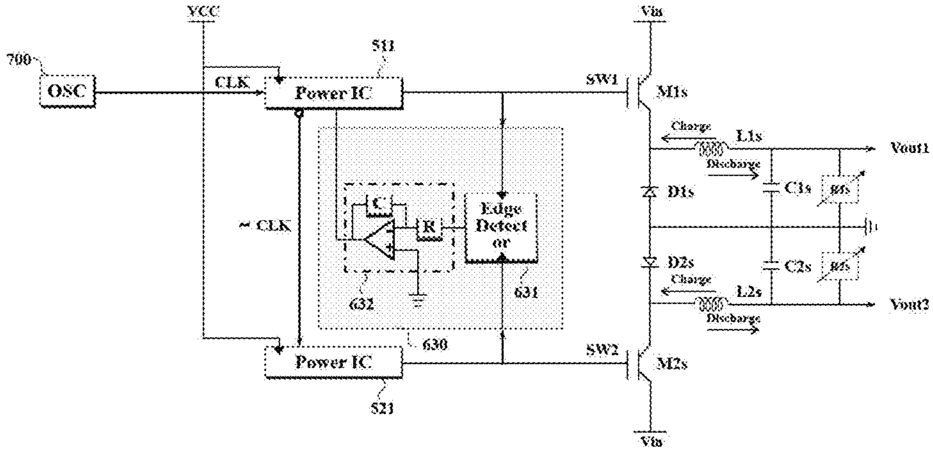
FIG. 15 is a circuit diagram showing that DC output voltages are generated using the inside of the phase detector and the switching signals output from the first power IC and the second power IC according to the fifth embodiment of the present disclosure.

FIG. 15 is a circuit diagram showing the inside of the phase detector according to the fifth embodiment of the present disclosure.

Referring to FIG. 15, the phase detector 630 may include an edge detector circuit 631 for detecting edges of the switching signals SW1 and SW2 and an integrator 632 for accumulating the detected edge signals and supplying the accumulated signals to the first power IC 511. The first power IC 511 may receive the accumulated signals from the integrator 632 and adjust, based on the accumulated signals, a phase of the inverted clock signal CLKB that is then output to the second power IC 521. By adjusting the phase of the inverted clock signal CLKB, an output of the edge detector circuit 631 may be maintained at the ground voltage (0 V) which corresponds to the switching signals SW1 and SW2 having opposite phases with respect to each other.

The edge detector circuit 631 may have a first input terminal connected to an output terminal of the first power IC 511 and a second input terminal connected to an output terminal of the second power IC 521. An output terminal of the edge detector circuit 631 may be connected to an inverting terminal ("-" terminal) of the integrator 632. A resistor may be further connected between the output terminal of the edge detector circuit 631 and the inverting terminal ("−" terminal) of the integrator 632.

The inverting terminal ("−" terminal) of the integrator 632 may be connected to the output terminal of the edge detector circuit 631, and a non-inverting terminal ("+" terminal) of the integrator 632 may be connected to the ground line. The output terminal of the integrator 632 may be connected to the first power IC 511, and a capacitor may be further connected between the output terminal and the inverting terminal ("−" terminal) of the integrator 632.

Referring to FIG. 15, the first switching signal SW1 output from the first power IC 511 may be input to a gate electrode of the first switching MOSFET M1s to generate the first DC output voltage Vout1 using the PWM method. In this case, to stably output the first DC output voltage Vout1, the phase detector 630 may further include a first switching diode D1s, a first switching inductor L1s, a first switching capacitor C1s, and a first variable resistor R1s.

The second switching signal SW2 output from the second power IC 521 may be input to a gate electrode of the second switching MOSFET M2s to generate the second DC output voltage Vout2 using the PWM method. In this case, to stably output the second DC output voltage Vout2, the phase detector 630 may further include a second switching diode D2s, a second switching inductor L2s, a second switching capacitor C2s, and a second variable resistor R2s.

Figure 16:
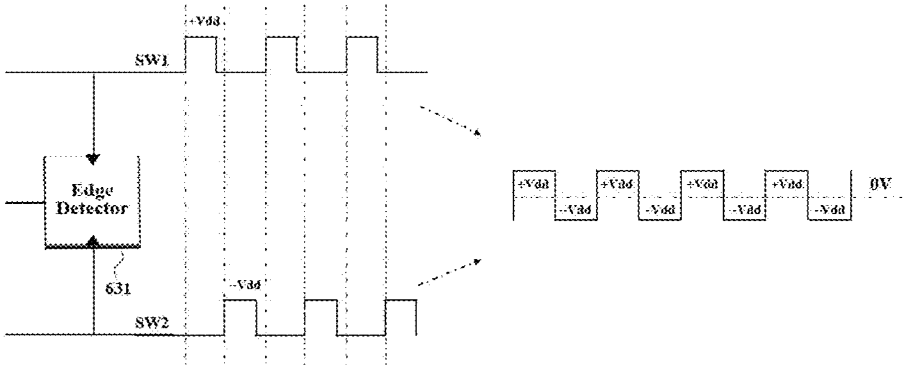
FIG. 16 is a timing diagram showing that switching signals detected from an edge detector are canceled according to the fifth embodiment of the present disclosure.

FIG. 16 is a timing diagram showing that switching signals detected from an edge detector circuit are canceled according to the fifth embodiment of the present disclosure.

Referring to FIGS. 15 and 16, the output terminal of the edge detector circuit 631 outputs the sum of accumulated values of a high potential voltage +Vdd output from the first switching signal SW1 and a low potential voltage −Vdd output from the second switching signal SW2.

When the output of the edge detector circuit 631 is maintained at the ground voltage (0 V), it can be seen that the second switching signal SW2 and the first switching signal SW1 have the same phase width, inverted shapes with respect to each other, and the same absolute value of magnitude. When the output of the edge detector circuit 631 is not the ground voltage (0 V), the voltage accumulated through the output terminal of the integrator 632 is input to the first power IC. The first power IC may determine the input accumulated voltage and compensate the phases of the first switching signal SW1 and the second switching signal SW2 to be the same through the first variable resistor R1s and the second variable resistor R2s.

Figure 17:
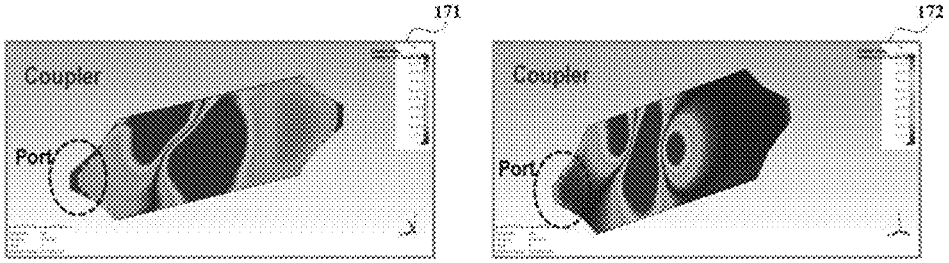
FIG. 17 is a view showing coupler introduction noise according to one or more embodiments of the present disclosure.

FIG. 17 is a view showing coupler introduction noise according to one or more embodiments of the present disclosure.

Referring to FIG. 17, a coupler may have a long hexagonal shape having an input port. The DC output voltage Vout may be connected to the input port PORT of the coupler.

Referring to a graph 171, it shows that noise is generated throughout the coupler when the inverted switching signal is not used.

Referring to a graph 172, it shows that noise is reduced throughout the coupler when the inverted switching signal is used.

Figure 18:
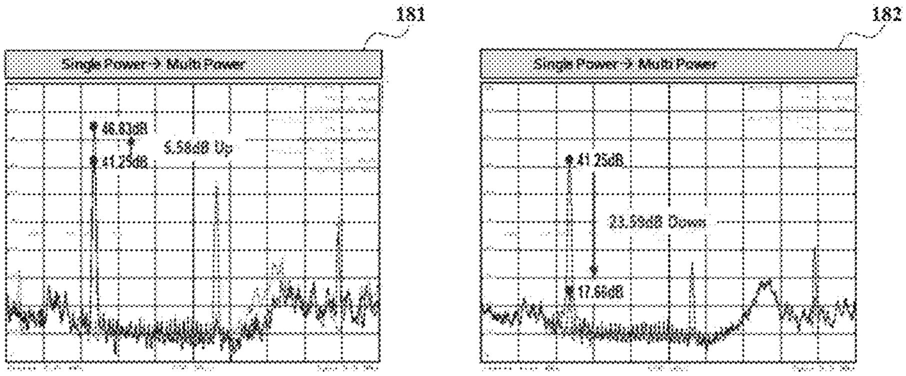
FIG. 18 is a view showing the effect of inverted switching signal when driving a display device according to one or more embodiments of the present disclosure.

FIG. 18 is a view showing the effect of inverted switching signal when driving a display device according to one or more embodiments of the present disclosure.

Horizontal axes of graphs 181 to 182 in FIG. 18 indicate frequency with a unit in megahertz (MHz), and vertical axes indicate noise with a unit in decibel (dB).

Referring to the graph 181, when the power driver 500 is used as the first power driver 510 and the second power driver 520, it shows that noise is increased by 5.58 dB.

Referring to the graph 182, when the first power driver 510 and the second power driver 520 use the inverted switching signal, noise is decreased by 23.59 dB.

A method of driving the above-described display device according to the embodiment of the present disclosure will be schematically described as follows. However, the description related to the driving method is only schematically described to help understanding and should be construed as the entirety of the detailed description of the present disclosure.

First, the timing controller 200 outputs the first data enable signal DE1 and the second data enable signal DE2. The first data enable signal DE1 is received at the first power IC 511 inside the first power driver 510 that supplies first power to the display panel 110. The second data enable signal DE2 is received at the second power IC 512 inside the second power driver 520 that supplies second power to the display panel 120. Next, the first power IC 511 and the second power IC 521 each generate the switching signal having the same phase width, inverted shapes with respect to each other, and the same absolute value of magnitude based on the first and second data enable signals DE1 and DE2.

The first power IC 511 and the second power IC 521 may receive the clock signal CLK and the inverted clock signal CLKB from the frequency generator circuit 700 rather than the timing controller 200.

In addition, the second power IC 521 may receive the second data enable signal DE2 and the inverted clock signal CLKB from the delay circuit 610 and the inverter 620, respectively, rather than the timing controller 200 and the frequency generator circuit 700.

According to the display device according to the embodiments of the present disclosure, it is possible to improve the noise characteristics by outputting the inverted switching signal from the first power IC and the second power IC.

The above description and the accompanying drawings are merely illustrative of the technical spirit of the present disclosure, and those skilled in the art to which the present disclosure pertains can perform various changes or modifications, such as coupling, separation, substitution, and change of components, without departing from the essential characteristics of the present disclosure. Therefore, the embodiments disclosed herein are not intended to limit the technical spirit of the present disclosure, but to describe the same, and the scope of the technical spirit of the present disclosure is not limited by these embodiments. The scope of the present disclosure should be construed according to the appended claims, and all technical spirits within the equivalent range should be construed as being included in the scope of the present disclosure.

What is claimed is:

1. A display device, comprising:

a timing controller configured to output image data, a command signal, and a data enable signal;

a display panel including a plurality of pixels and data lines that are connected to the plurality of pixels;

a first power driver configured to supply first power to the display panel, the first power driver including a first power integrated circuit (IC) configured to generate a first switching signal based on the data enable signal;

a second power driver configured to supply second power to the display panel, the second power driver including a second power IC configured to generate a second switching signal based on the data enable signal, a frequency generator circuit configured to generate a clock signal and supply the clock signal to the first power IC; and a phase detector configured to receive the first switching signal from the first power IC and receive the second switching signal from the second power IC, wherein the first switching signal and the second switching signal have a same phase width, inverted shapes with respect to each other, and a same absolute value of magnitude, wherein the first power IC is configured to generate an inverted clock signal by inverting the clock signal, and supply the inverted clock signal to the second power IC, and wherein the phase detector includes:

an edge detector circuit configured to detect first edges of the first switching signal and second edges of the second switching signal, and generate edge signals based on the first edges and the second edges; and an integrator configured to generate an accumulated signal by accumulating the edge signals and supply the accumulated signal to the first power IC.

2. The display device of claim 1, wherein the data enable signal comprises a first data enable signal and a second data enable signal, and the timing controller is further configured to supply the first data enable signal to the first power IC, and supply the second data enable signal to the second power IC.

3. The display device of claim 1, wherein the data enable signal comprises a first data enable signal and a second data enable signal, and the display device further comprising:

a delay circuit configured to:

receive the first data enable signal from the timing controller;

generate a second data enable signal by delaying the first data enable signal; and supply the second data enable signal to the second power IC, wherein the timing controller is further configured to supply the first data enable signal to the first power IC.

4. The display device of claim 3, wherein the delay circuit comprises:

a resistor connected in series to a first signal line through which the first data enable signal is transmitted; and a capacitor connected between a second signal line through which the second data enable signal is transmitted and a ground line.

5. The display device of claim 1, further comprising a frequency generator circuit configured to:

generate a clock signal and an inverted clock signal;

supply the clock signal to the first power IC; and supply the inverted clock signal to the second power IC.

6. The display device of claim 1, further comprising:

a frequency generator circuit configured to generate a clock signal and supply the clock signal to the first power IC; and an inverter configured to receive the clock signal from the frequency generator circuit and output an inverted clock signal of the received clock signal to the second power IC.

7. A method of driving a display device, comprising:

outputting, by a timing controller of the display device, a data enable signal;

generating, by a first power integrated circuit (IC) of a first power driver of the display device, a first switching signal based on the data enable signal;

supplying, by the first power driver, first power to a display panel of the display device based on the first switching signal;

generating, by a second power IC of a second power driver of the display device, a second switching signal based on the data enable signal;

supplying, by the second power driver, second power to the display panel based on the second switching signal;

generating and supplying, by a frequency generator circuit of the display device, a clock signal to the first power IC; and receiving, by a phase detector of the display device, the first switching signal from the first power IC and receive the second switching signal from the second power IC, wherein the first switching signal and the second switching signal have a same phase width, inverted shapes with respect to each other, and a same absolute value of magnitude, wherein the first power IC is configured to generate an inverted clock signal by inverting the clock signal, and supply the inverted clock signal to the second power IC, and wherein the phase detector includes:

an edge detector circuit configured to detect first edges of the first switching signal and second edges of the second switching signal, and generate edge signals based on the first edges and the second edges; and an integrator configured to generate an accumulated signal by accumulating the edge signals and supply the accumulated signal to the first power IC.

8. The method of claim 7, wherein the data enable signal comprises a first data enable signal and a second data enable signal, and the method further comprising:

supplying, by the timing controller, the first data enable signal to the first power IC; and supplying, by the timing controller, the second data enable signal to the second power IC.

9. The method of claim 7, the data enable signal comprises a first data enable signal and a second data enable signal, and the method further comprising:

supplying, by the timing controller, the first data enable signal to the first power IC;

receiving, by a delay circuit of the display device, the first data enable signal from the timing controller;

generating, by the delay circuit, a second data enable signal by delaying the first data enable signal; and supplying, by the delay circuit, the second data enable signal to the second power IC.

10. The method of claim 7, further comprising:

generating, by a frequency generator circuit of the display device, a clock signal and an inverted clock signal;

supplying, by the frequency generator circuit, the clock signal to the first power IC; and supplying, by the frequency generator circuit, the inverted clock signal to the second power IC.

11. The method of claim 7, further comprising:

generating, by a frequency generator circuit of the display device, a clock signal;

supplying, by the frequency generator circuit, the clock signal to the first power IC;

receiving, by an inverter of the display device, the clock signal; and outputting, by the inverter, an inverted clock signal of the received clock signal to the second power IC.

12. A display device, comprising:

a timing controller configured to generate one or more data enable signals;

a first display panel having a first plurality of pixels;

a second display panel having a second plurality of pixels;

a first power driver configured to generate a first switching signal having a first phase based on the one or more data enable signals and generate one or more first output voltages based on the first switching signal, wherein the one or more first output voltages include one or more first power supply voltages for supplying power to the first display panel;

a second power driver configured to generate a second switching signal having a second phase that is different from the first phase based on the one or more data enable signals and generate one or more second output voltages based on the second switching signal, wherein the one or more second output voltages include one or more second power supply voltages for supplying power to the second display panel;

a frequency generator circuit configured to generate a clock signal and supply the clock signal to the first power driver; and a phase detector configured to receive the first switching signal from the first power driver and receive the second switching signal from the second power driver, wherein the first power driver is configured to generate an inverted clock signal by inverting the clock signal, and supply the inverted clock signal to the second power driver, and wherein the phase detector includes:

an edge detector circuit configured to detect first edges of the first switching signal and second edges of the second switching signal, and generate edge signals based on the first edges and the second edges; and an integrator configured to generate an accumulated signal by accumulating the edge signals and supply the accumulated signal to the first power driver.

13. The display device of claim 12, wherein the first phase is opposite to the second phase, and the first switching signal and the second switching signal have a same cycle of one horizontal period and a same absolute value of magnitude.

14. The display device of claim 12, wherein:

the one or more data enable signals include a first data enable signal;

the display device further comprises a delay circuit configured to receive the first data enable signal and generate a second data enable signal by delaying the first data enable signal;

the first power driver is further configured to generate, based on the first data enable signal, the first switching signal having the first phase; and the second power driver is further configured to generate, based on the second data enable signal, the second switching signal having the second phase.

15. The display device of claim 12, wherein:

the one or more data enable signals include a clock signal;

the timing controller comprises a frequency generator circuit configured to generate the clock signal;

the display device further comprises an inverter configured to receive the clock signal and output an inverted clock signal;

the first power driver is further configured to generate, based on the clock signal, the first switching signal having the first phase; and the second power driver is further configured to generate, based on the inverted clock signal, the second switching signal having the second phase.

16. The display device of claim 12, wherein:

the one or more data enable signals include a clock signal;

the timing controller includes a frequency generator circuit configured to generate the clock signal;

the first power driver includes a first power integrated circuit (IC) configured to:

receive the clock signal from the frequency generator circuit, generate, based on the clock signal, the first switching signal having the first phase, and generate an inverted clock signal by inverting the clock signal; and the second power driver includes a second power IC configured to:

receive the inverted clock signal from the first power IC, and generate, based on the inverted clock signal, the second switching signal having the second phase.

17. The display device of claim 12, further comprising:

a first gate driver circuit connected to the first plurality of pixels; and a second gate driver circuit connected to the second plurality of pixels, wherein the first power driver is further configured to generate at least one first output voltage based on the first switching signal and supply the at least one first output voltage to the first gate driver circuit, and wherein the second power driver is further configured to generate at least one second output voltage based on the second switching signal and supply the at least one second output voltage to the second gate driver circuit.

* * * * *